(12) United States Patent
Östrup

(10) Patent No.: US 8,626,170 B2
(45) Date of Patent: Jan. 7, 2014

(54) METHODS AND DEVICES WITH AN ADAPTIVE NEIGHBOURING CELL RELATIONS FUNCTION

(75) Inventor: Peter Östrup, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 132 days.

(21) Appl. No.: 13/260,286

(22) PCT Filed: Mar. 30, 2009

(86) PCT No.: PCT/SE2009/050330
§ 371 (c)(1),
(2), (4) Date: Sep. 24, 2011

(87) PCT Pub. No.: WO2010/114435
PCT Pub. Date: Oct. 7, 2010

(65) Prior Publication Data
US 2012/0021748 A1    Jan. 26, 2012

(51) Int. Cl.
*H04W 36/30* (2009.01)

(52) U.S. Cl.
USPC .................................. 455/437; 455/456.3

(58) Field of Classification Search
USPC ................ 455/437, 436, 456.1–456.5
See application file for complete search history.

(56) References Cited

U.S. PATENT DOCUMENTS

| 6,560,442 | B1 * | 5/2003 | Yost et al. ................... | 455/423 |
| 2010/0080323 | A1 * | 4/2010 | Mueck et al. ............... | 375/296 |
| 2010/0285802 | A1 * | 11/2010 | Ahluwalia et al. .......... | 455/436 |

FOREIGN PATENT DOCUMENTS

| EP | 2023678 | A2 | 2/2009 | |
| GB | 2455060 | * | 10/2007 | ............ H04W 72/08 |

OTHER PUBLICATIONS

EPO, International Search Report in PCT/SE2009/050330, Dec. 15, 2009.
Ericsson, 3GPP Change Request R3-072014, Introduction of Automatic Neighbour Relation Function, Oct. 11, 2007, pp. 1-4, Sophia Antipolis, France.
3GPP, Technical Specification 36.300 V8.7.0, Evolved Universal Terrestrial Radio Access (E-UTRA) and Evolved Universal Terrestrial Radio Access Network (E-UTRAN) Overall Description Stage 2 (Release 8), Jan. 5, 2009, pp. 1-78.
Ericsson, 3GPP Doc S5-080409, Requirements for Automatic Neighbour Relations, Feb. 22, 2008, pp. 1-5, St Julian, Malta.
Nortel, 3GPP Doc R3-081226, ANR Neighbors IP Address Lookup and Establishment, May 9, 2008, pp. 1-5, Kansas City, Missouri.
3GPP, Technical Specification 36.423 V8.5.0, Evolved Universal Terrestrial Radio Access Network (E-UTRAN) X2 Application Protocol (X2AP) (Release 8), Mar. 17, 2009, pp. 1-100.

* cited by examiner

*Primary Examiner* — Sam Bhattacharya
(74) *Attorney, Agent, or Firm* — Potomac Patent Group PLLC

(57) ABSTRACT

Embodiments herein relate to a method in a first communication device with an adaptive neighboring cell relations function. The first communication device receives (42) a measurement report of a possible neighboring cell candidate of a second communication device from a user equipment camped/connected within a first cell served by the first communication device and determines (44) to set up an inter node connection to the second communication device serving the possible neighboring cell candidate indicated in the received measurement report. The firs communication device then initiates (46) to set up the inter node connection to the second communication device by sending a connection request comprising a geographical position of the first communication device.

20 Claims, 9 Drawing Sheets

METHODS AND DEVICES WITH AN ADAPTIVE NEIGHBOURING CELL RELATIONS FUNCTION

TECHNICAL FIELD

The invention relates to methods and communication devices in a communications network, in particular, for determining neighbour relationship between communication devices.

BACKGROUND

In communications networks when, for example, performing a handover of a user equipment (UE) from one cell to another one need to establish a neighbour relationship between base stations serving the cells.

In Long Term Evolution systems (LTE), an Adaptive Neighbouring Cell Relations (ANR) function is used in the base stations. The ANR is defined in 3GPP TS 36.331 as a function that automatically conFigures neighbouring cell relations between cells. This is done by assistance from a UE.

A first eNodeB serving a first cell has an ANR function. As a part of the normal call procedure, the first eNodeB instructs each UE to perform measurements on the surrounding radio environment. The first eNodeB may use different policies for instructing the UE to do measurements, and when to report them to the first eNodeB. This measurement procedure comprises the steps:

The UE sends a measurement report regarding a second cell of a second eNodeB. This report contains the second cell's Physical Cell ID (Phy-CID), but not the second cell's Global-CID.

When the first eNodeB receives a UE measurement report containing Phy-CID, the following sequence may be used.

The first eNodeB instructs the UE, using the newly discovered Phy-CID as parameter, to read the Global-CID, tracking area code (TAC) and all available Public Land Mobile Network (PLMN) ID(s) of the related second cell. To do so, the first eNodeB may need to schedule appropriate idle periods to allow the UE to read the Global-CID from the broadcast channel (BCH) of the detected second cell in any known manner.

When the UE has found out the second cell's Global-CID on the BCH, the UE reports the detected Global-CID to the first eNodeB serving the first cell. In addition, the UE reports the TAC and all PLMN IDs that have been detected, whenever the first eNodeB requests this information.

The first eNodeB decides to add this neighbour relation, and can use Phy-CID and Global-CID to:
  a Lookup a transport layer address to the new second eNodeB.
  b Update its Neighbour Relation List.
  c If needed, setup a new X2 interface towards this second eNodeB.

There is a security problem with ANR in that the ANR functionality utilizes information from the UEs to conFigure neighbouring cell relations.

A "hostile" UE could report "fictional" physical cell identities. This could lead to the creation of neighbouring cells, the creation of neighbouring cell relations and that the establishment of X2 interfaces are initiated.

This type of behaviour could be viewed as a type of Denial of Service (DoS) attack since the "fictional" neighbouring cells would block "real" neighbouring cells (and relations) from being created; setting up X2 interfaces to fictional neighbouring cells leaving no capacity to "real" neighbouring cells. Also, the attack would cause increased signalling load in the radio access network (RAN) since X2 connection establishment would be initiated when the "fictional" neighbouring cell is belonging to another base station.

These types of security issues could be an increasing problem when open source Operating Systems are introduced in the UEs, such as Android and or the like, wherein hostile attacks may increase from different operators/UEs and/or the like.

A similar problem could also occur due to e.g. weather conditions. In certain weather, the radio propagates further (atmospheric reflection) and this will lead to that UEs may report the physical identities of base stations far away from their serving base station.

When the "wrong" neighbouring cell relation has been conFigured by ANR, the UEs are handed over to the "wrong" base station leading to an increased risk of connections being dropped.

SUMMARY

Embodiments herein disclose a reliable and efficient manner to setup a neighbour relationship between communication devices, for example, base stations.

In some embodiments, a method in a first communication device with an adaptive neighbouring cell relations function is disclosed. The first communication device receives a measurement report of a possible neighbouring cell candidate of a second communication device from a user equipment camped/connected within a first cell served by the first communication device, and determines to set up an inter node connection to the second communication device serving the possible neighbouring cell candidate indicated in the received measurement report. Furthermore, the first communication device initiates to set up the inter node connection to the second communication device by sending a connection request comprising a geographical position of the first communication device to the second communication device.

In order to perform the method a first communication device is provided. The first communication device comprises an adaptive neighbouring cell relations function stored on a memory unit of the first communication device and a control unit arranged to execute the adaptive neighbouring cell relations function The first communication device further comprises a receiving arrangement adapted to receive a measurement report of a possible neighbouring cell candidate from a user equipment connected/camped within a cell of the first communication device. In addition, the control unit is arranged to determine to set up an inter node connection to the second communication device serving the possible neighbouring cell candidate indicated in the received measurement report, and to initiate to set up the inter node connection to the second communication device by sending a connection request comprising a geographical position of the first communication device to the second communication device over a network interface.

In some embodiments a method in a second communication device is disclosed. The second communication device receives a connection request for setting up an inter node connection between a first communication device and the second communication device from the first communication device, wherein the connection request comprises a geographical position of the first communication node. The second communication device determines an inter node connection response to the request by comparing the geographical position of the first communication device with a geographical position of the second communication device, wherein the inter node connection response comprises a negative inter node connection response if it is determined that the geographical position of the first communication device is not within a range of the geographical position of the second communication device indicating a non neighbouring relationship. Furthermore, the second communication device transmits the inter node connection response to the first communication device.

In order to perform the method a second communication device is provided. The second communication device comprises a network interface arranged to receive a connection request for setting up an inter node connection between a first communication device and the second communication device from a first communication device, wherein the connection request comprises a geographical position of the first communication node. The second communication device comprises a control unit arranged to determine an inter node connection response to the connection request by comparing the geographical position of the first communication device with a geographical position of the second communication device, wherein the inter node connection response comprises a negative inter node connection response if it is determined that the geographical position of the first communication device is not within a range of the geographical position of the second communication device indicating a non neighbouring relationship. The network interface is further being arranged to transmit the inter node connection response to the first communication device.

Embodiments disclose a way to add a geographical position, such as a Global Positioning System (GPS) position, of a requesting base station in an X2 SETUP REQUEST message of the X2-Application Protocol (X2AP) specification. The geographical position could also be complimented with the direction (and coverage) of each cell served by a requesting base station.

In this way, a base station receiving an X2 SETUP REQUEST message have the possibility to check its geographical position towards the received geographical position of the requesting base station and can thus judge if the relation is sensible or not.

A new Cause value should also be included in the X2 SETUP RESPONSE message so that the base station that initiated the X2 connection establishment may "blacklist" the cell having been reported as a possible neighbouring cell candidate.

Finally, the base station could "blacklist" the reporting UE so that the ANR function does not take any more action upon subsequent suggestions for neighbouring cell relations from that UE. This "blacklisting" should probably only be surviving for as long as the UE is in Connected Mode, and could be transferred in Handover signalling to other base stations so that also other base stations do not act upon reports from that UE.

Unsuccessful ANR configurations should obviously always be logged and should there be many, within a certain time period, there should possibly be an alarm indicating that a Denial of Service (DoS) attack may be occurring.

BRIEF DESCRIPTION OF THE DRAWINGS

Embodiments will now be described in more detail in relation to the enclosed drawings, in which.

DETAILED DESCRIPTION

Figure 1:
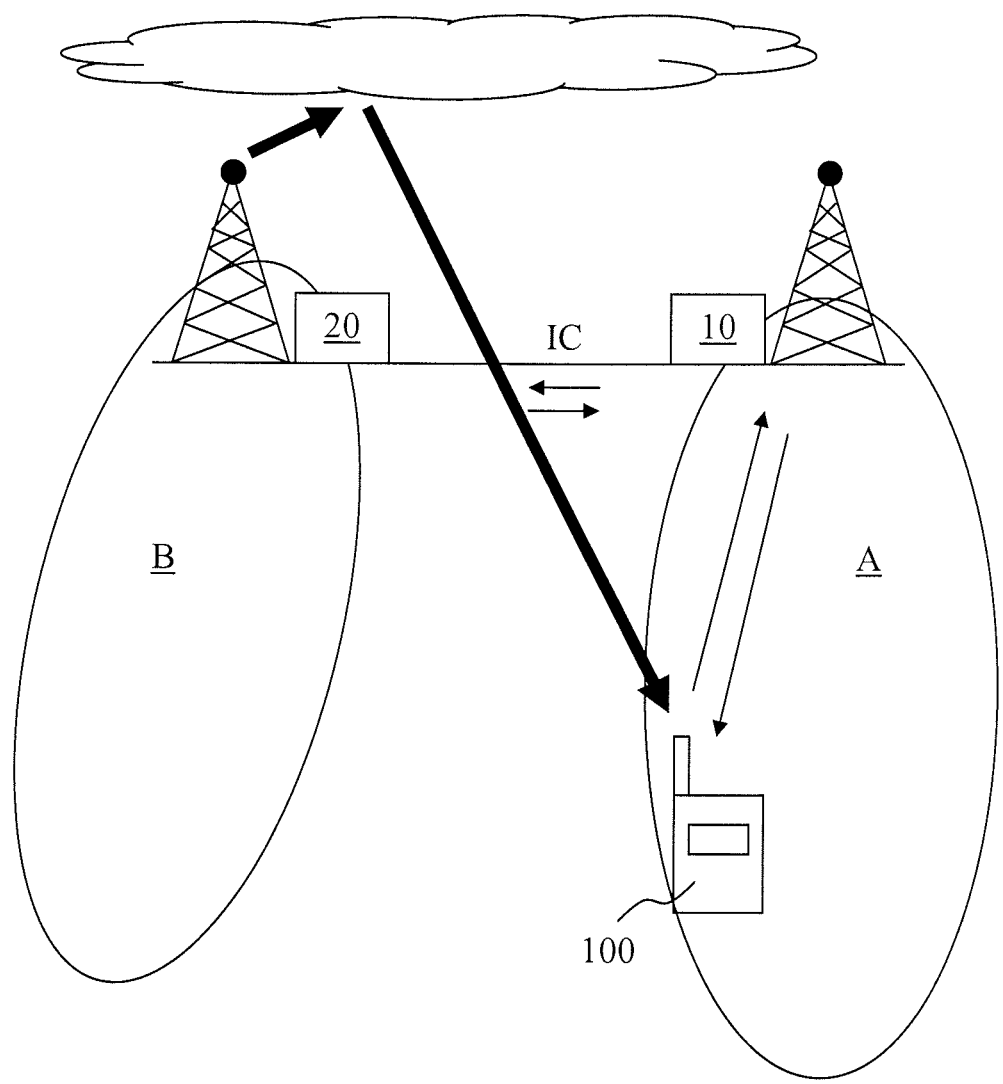
FIG. 1 shows a schematic overview of a communications network.

In FIG. 1, a schematic overview of a communications network is shown. The communications network may comprise an Advanced LTE, LTE, Universal Mobile Telecommunications System (UMTS), and/or the like.

A first User Equipment (UE) 100 is connected/camped on a cell A of a first base station 10. The UE 100 transmits a measurement report comprising a cell ID of a cell B served by a second base station 20 to the serving first base station 10. The first base station 10 may determine that the cell B is a neighbouring cell to the cell A based on information in the measurement report, for example, cell ID, UE identity, signal strength, and/or the like, and sends a connection request to the second base station 20, wherein the connection request comprises a geographical position, for example, GPS data and/or the like, of the first base station 10. However, the UE 100 may have received a broadcast channel from the second base station 20 due to radio propagation (atmospheric reflection) and this will lead to that UE 100 reports the physical identity of the second base station 20, wherein the second base station 20 is located far away from the first base station 10.

The second base station 20 compares the geographical position of the first base station 10 with the geographical position of the second base station 20 and responds to the connection request based on the comparison. If the first base station 10 is determined to be outside a range, such as >10 km or the like, of the second base station 20 the connection request is denied. The range may be determined based on coverage and strength of cell A. The range may, for example, be set to twice the radius of the coverage of the cell A and/or the like.

The first communication device 10 receives the response stating that the connection request is denied. In some embodiments, the response may comprise a cause value indicating the cause of denying the connection request, for example, a value indicating that the cell is determined not to be a neighbouring cell and/or the like. The first communication device 10 may then store the cell and/or the reporting UE 100 to be a false cell/UE in a local list of the first communication device 10 so that reports from that UE/ of that cell is ignored by the first communication device 10.

The identity of the cell and/or the UE 100 may also be reported to neighbouring communication devices in, for example, hand over signalling and/or the like.

Figure 2:
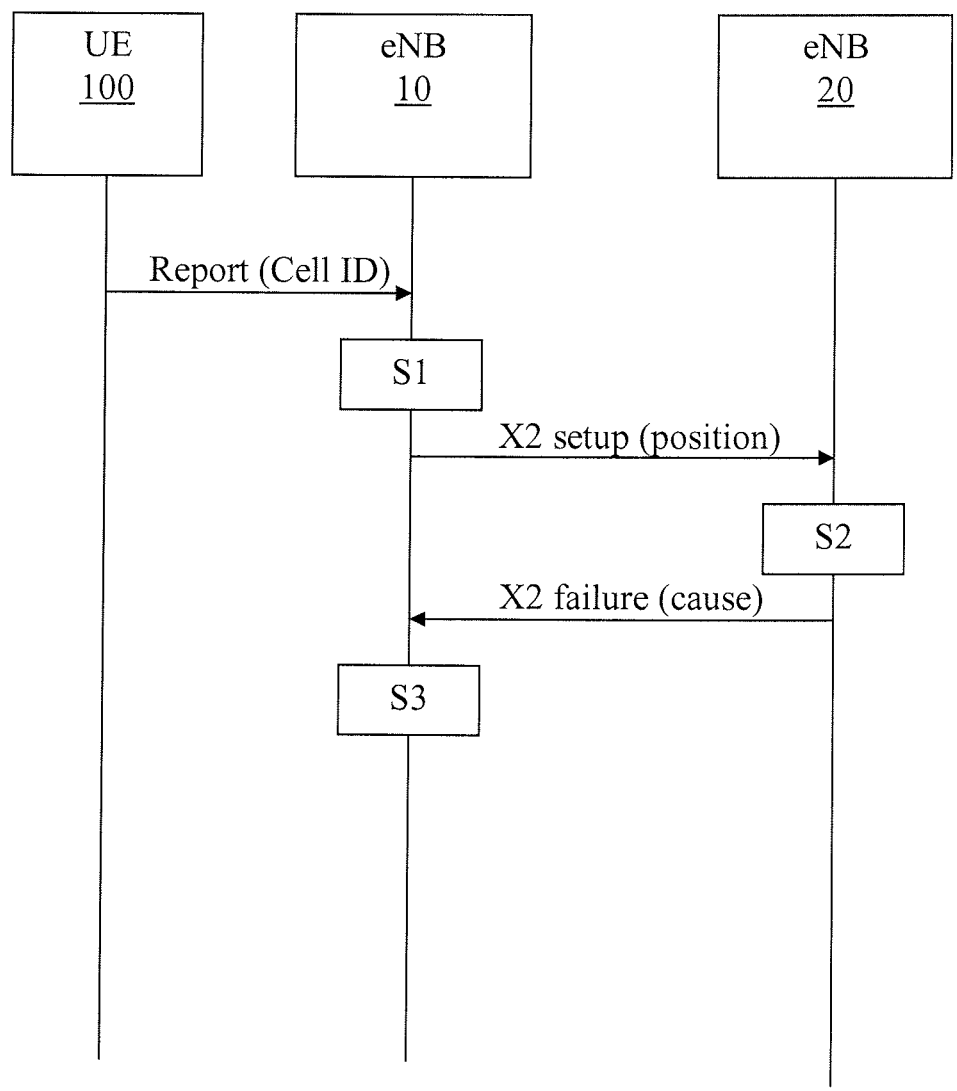
FIG. 2 shows a schematic combined method and signaling scheme in a communications network.

In FIG. 2, a schematic combined method and signalling scheme in a communications network is shown.

A UE 100 reports a measurement of a possible neighbouring cell served by a second base station eNB 20 to a first base station eNB 10 serving the present cell of UE 100.

When the eNB 10 receives the report of the possible neighbouring cell candidate, the eNB 10 may read the Phy CID from the report as the report comprises the possible neighbouring cell's Phy-CID.

The eNB 10 may then instruct the UE 100, using the newly discovered Phy-CID as parameter, to read the Global-CID, tracking area code (TAC) and all available Public Land Mobile Network (PLMN) ID(s) of the related possible neighbouring cell. To do so, the eNodeB 10 may need to schedule appropriate idle periods to allow the UE 100 to read the Global-CID from the broadcast channel (BCH) of the detected possible neighbouring cell candidate in any known manner.

When the UE 100 has found out the possible neighbouring cell's Global-CID on the BCH, the UE 100 reports the detected Global-CID to the eNB 10 serving the cell of the UE 100. In addition, the UE 100 reports the TAC and all PLMN IDs that have been detected, whenever the eNB 10 requests this information.

In step S1, when the UE 100 has reported the possible neighbouring cell candidate, the eNB 10 will initiate the establishment of an X2 connection to the eNB 20 serving the possible neighbouring cell candidate.

In an X2 SETUP REQUEST message, sent to the eNB 20, a new information element will be included describing the geographical position of the eNB 10 initiating the X2 establishment attempt, and also possibly the direction and coverage area of each cell belonging to eNB 10. The geographical position, for example, longitude and latitude, may be determined from a GPS system on the eNB 10, manually at the installation of the eNB 10, determined by triangulation, and/or the like.

In step S2, the base station eNB 20 receiving the X2 SETUP REQUEST message will evaluate if the received X2 SETUP REQUEST is a sensible configuration through checking the received geographical position, (and coverage information) towards the geographical position (and coverage information) of the own, served cells. The geographical position of the eNB 20, for example, longitude and latitude, may similarly be determined from GPS, manually, triangulation, and/or the like.

Should the eNB 20 receiving the X2 SETUP REQUEST message determine that it would not be sensible to establish a neighbouring cell relation between any of the own cells towards any of the cells present in the X2 SETUP REQUEST, it will answer the X2 SETUP REQUEST with an X2 SETUP FAILURE message. The X2 SETUP FAILURE message may in this case include a new cause value indicating that the proposed establishment of a neighbouring cell relationship is rejected since the relationship would not be sensible from a radio perspective. A sensible neighbouring cell may be a cell that is within a preset range from the eNB 20. The preset range may be set as twice the radius of a cell of eNB 20.

In step S3, when the eNB 10 receives an X2 SETUP FAILURE message with the new cause value, it may move the identity of the cell that initiated the X2 connection establishment attempt into a "blacklist" (and possibly the other cells served by this eNB 20) so that no more X2 connection establishments are attempted towards this eNB 20 (the eNB 10 could also build an "eNB blacklist" with the eNB identities of the eNBs that has rejected an X2 connection establishment due to the reason of not being an eNB of a sensible neighbour cell). The cell may be indicated with the Phy-ID, the global ID and/or the like.

The eNB 10 could also or alternatively proceed with indicating in the UE context of the UE 100 that made the suggestion for a new neighbouring cell relation that no more suggestions of neighbouring cell relations from this UE 100 should be acted upon by an ANR function. The UE context of UE 100 may be stored in a blacklist at the eNB 10.

It should also be noted that these types of listing UEs, eNBs, cells may also be performed at the second eNB 20.

The indication that the UE 100 has been "blacklisted" from suggesting new neighbouring cell relations could then be transferred in subsequent Handover signalling for this UE (i.e. 3GPP TS 36.423 and 3GPP TS 36.413 impacts—e.g. X2 HANDOVER REQUEST message).

The system above enables, for example, the following:
The network is able to determine if a suggested neighbouring cell relation is sensible or not and will thus utilize network resources in a more optimal way
Less network signalling and processing due to "hostile" UEs is determined
Less radio signalling due to "hostile" UEs determined
Less dropped connections due to that UEs have been handed over to incorrect base stations.

Hence, the solution allows the network to determine if a suggested neighbouring cell relation is sensible or not.

Figure 3:
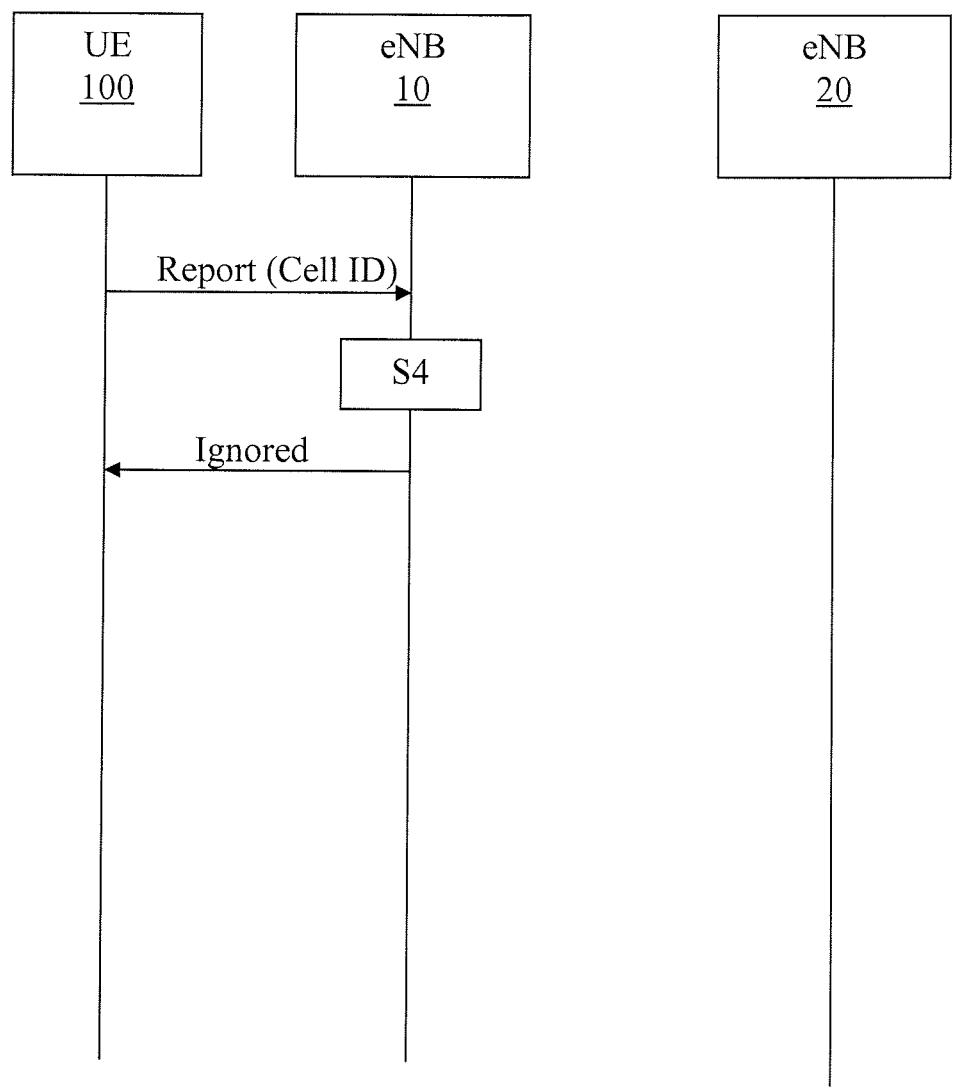
FIG. 3 shows a schematic combined method and signalling scheme in a communications network.

In FIG. 3, a schematic combined method and signalling scheme in a communications network is shown.

A UE 100 transmits a measurement report of a second cell of a base station eNB 20 to a base station eNB 10 serving a first cell within which the UE 100 is connected/camped on. The eNB 10 may identify UE 100, eNB 20 and/or the second cell.

In step S4, the eNB 10 checks whether the UE context of UE 100 is in a blacklist indicating UEs from which suggestions of new neighbouring cell relations should be ignored. It should be understood that the blacklist may also be based on UE context, eNB IDs, cell IDs, and/or the like, and may be created by the eNB 10, received in hand over signalling from eNB 20, and/or the like.

In the illustrated example, the eNB 10 determines that the UE 100 is not a reliable source being in the blacklist of eNB 10 and ignores the report and also sends an indication that cell measurements of the UE 100 are ignored to the UE 100. This may be good to know for the UE 100 because it may not be able to be handed over to another eNB as long as the UE 100 is in connected mode.

It should here be noted that all reports from the UE will not be ignored. If the UE sends a report regarding a cell known to the eNB as a neighbouring cell, a Handover may be initiated. But an unknown Physical Cell Identity (PCI) sent in by the UE will not initiate an ANR function, that is, the eNB 10 does not request the UE 100 to report back the global identity of the reported cell.

The UE 100 may be blacklisted as long as the UE 100 is in connected mode, a preset period of time, and/or the like.

Figure 4:
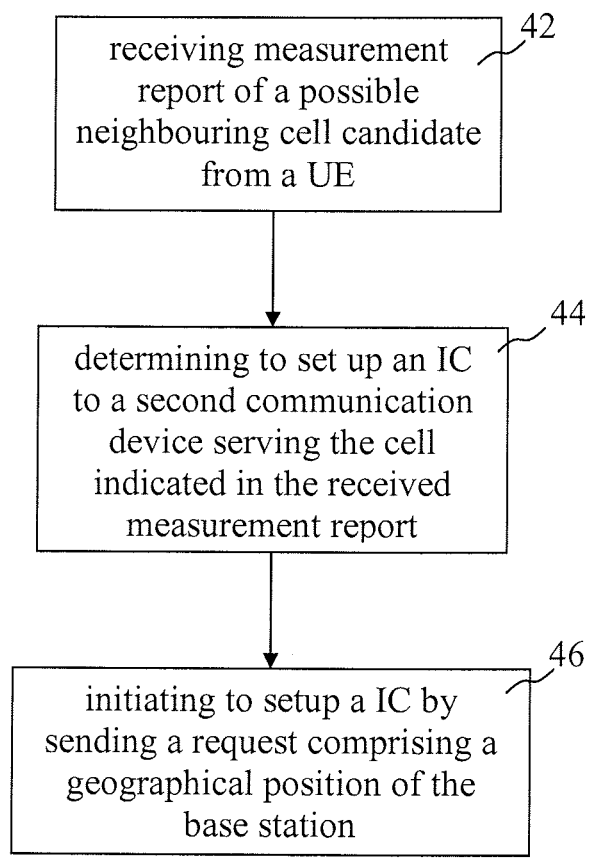
FIG. 4 shows a schematic overview of a flowchart of a method in a first communication device.

In FIG. 4, a schematic flowchart of a method in a first communication device is shown.

In step 42, the first communication device receives a measurement report of a possible neighbouring cell candidate from a user equipment camped/connected within a first cell served by the first communication device.

In step 44, the first communication device determines to set up an inter node connection to a second communication device serving the possible neighbouring cell candidate indicated in the measurement report. This may be determined based on checking list/s of already neighbouring cells, prohibited cells/UEs and/or the like.

In step 46, the first communication device initiates to set up an inter node connection to the second communication device by sending a connection request to the second communication device, wherein the connection request comprises a geographical position of the first communication device.

Figure 5:
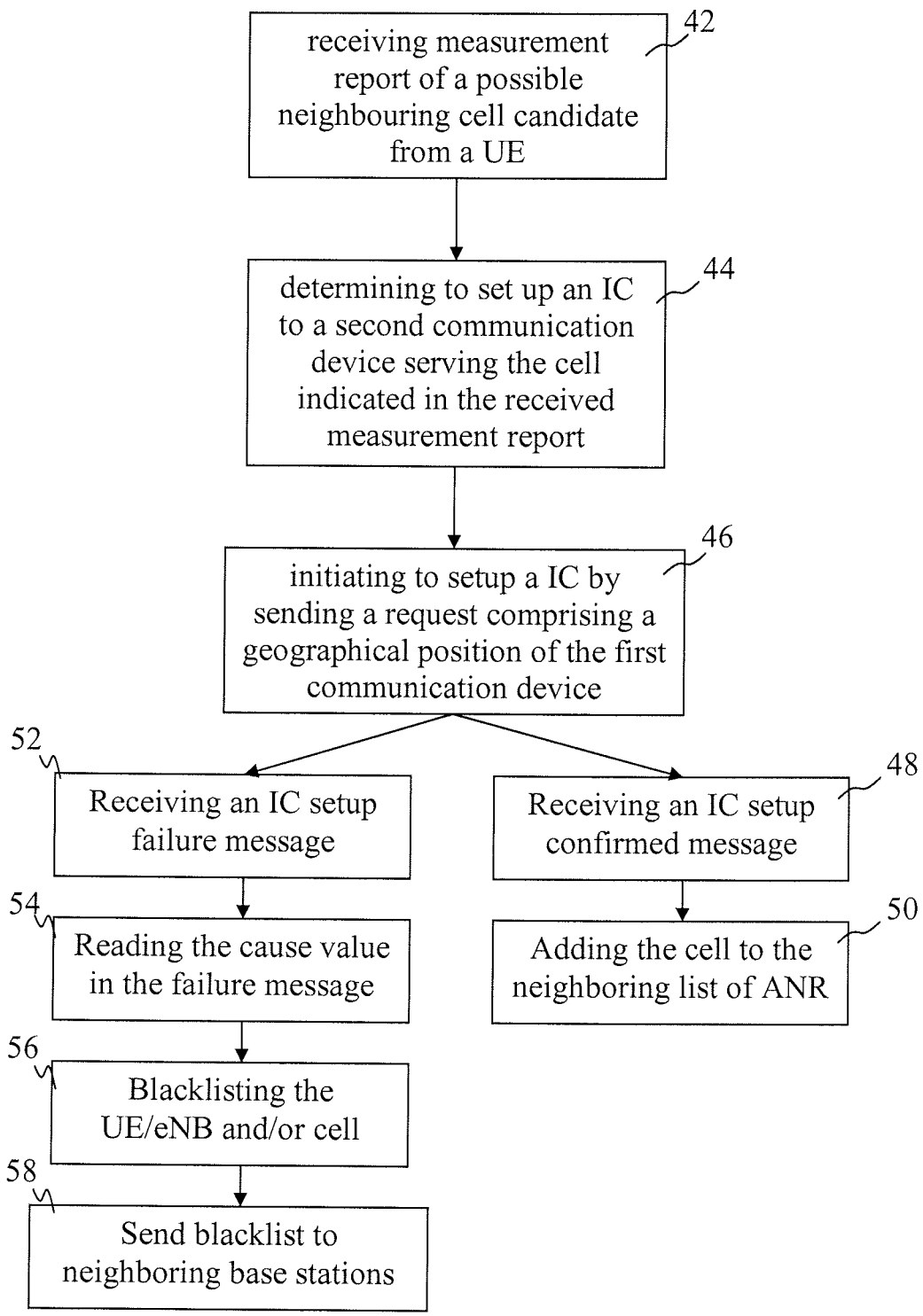
FIG. 5 shows a schematic overview of a flowchart of a method in a first communication device.

In FIG. 5, a schematic flowchart of a similar method in a first communication device is shown.

In step 42, the first communication device receives a measurement report of a possible neighbouring cell candidate from a user equipment camped/connected within a first cell served by the first communication device. The first communication device may determine Phy-CID of the possible neighbouring cell candidate from the report and request the user equipment to retrieve global CID of the possible neighbouring cell candidate. The global CID is then used to send an inter node connection request, such as an X2 setup request, an Iur setup request and/or the like.

In step 44, the first communication device determines to set up an inter node connection (IC) to a second communication device serving the possible neighbouring cell candidate indicated in the measurement report. The inter node connection comprises an X2 connection within an E-UTRAN and/or the like. This is done by sending a connection request to the (possible) neighbouring cell. The first communication device may also be enabled to check whether the Cell-ID, UE, and/or eNB IDs of the neighbouring cell is in a list of non trusted Cell-IDs, UEs, and/or eNBs indicating that no neighbouring relationship should be established or that the Cell ID is in a list of neighbouring cells.

In step 46, the first communication device initiates to set up an inter node connection to the second communication device by sending the connection request comprising a geographical position of the first communication device. The geographical position may comprise a Global Positioning System geographical position and/or the like. The connection request may also comprise a direction/coverage/output power of the first cell served by the first communication device.

Then, the first communication device may receive an inter node connection response to the connection request indicating a negative inter node connection response indicating a false neighbouring cell relationship, or a positive inter node connection response indicating a true neighbouring cell relationship.

In step 48, the first communication device receives a positive inter node connection response indicating a true neighbouring cell relationship, for example, an inter node connection setup confirmed message.

In step 50, the first communication device may then as a result of the positive inter node connection response decide to add the cell to a neighbour relation list of the adaptive neighbouring cell relations function (ANR). It should here be noted that the cell may be added to the neighbour relation list before determining to set up an inter node connection to the second communication device serving the neighbouring cell and if the inter node connection response is positive to keep the cell in the neighbour relation list or if the inter node connection response is negative to remove the cell from the neighbour relation list.

In step 52, the first communication device receives an inter node connection response to the connection request indicating a negative inter node connection response indicating a false neighbouring cell relationship, for example, an Inter node connection setup failure message.

In step 54, the first communication device may read a cause value in the received inter node connection response indicating that the inter node connection response is negative since the neighbouring relationship is not sensible from a geographical perspective.

In step 56, the first communication device stores the identity of the user equipment that sent the measurement report as a non trusted user equipment in a list, a so called blacklist. The first communication device may also/or alternatively store an identity of the second communication device in a list indicating that cells of communication devices listed in the list will not (never) be considered as neighbouring cells to the cells served by the first communication device.

In step 58, the first communication device may transmit an indication that the user equipment/cell is non-trusted to a neighbouring communication device. This may be performed in a handover signalling and the indication may be the blacklist.

The first communication device may also log the request procedure as a denied procedure to; for example, determine whether a denial of service attack is in progress.

In order to perform a method according to FIGS. 4 and 5 a first communication device is provided.

Figure 6:
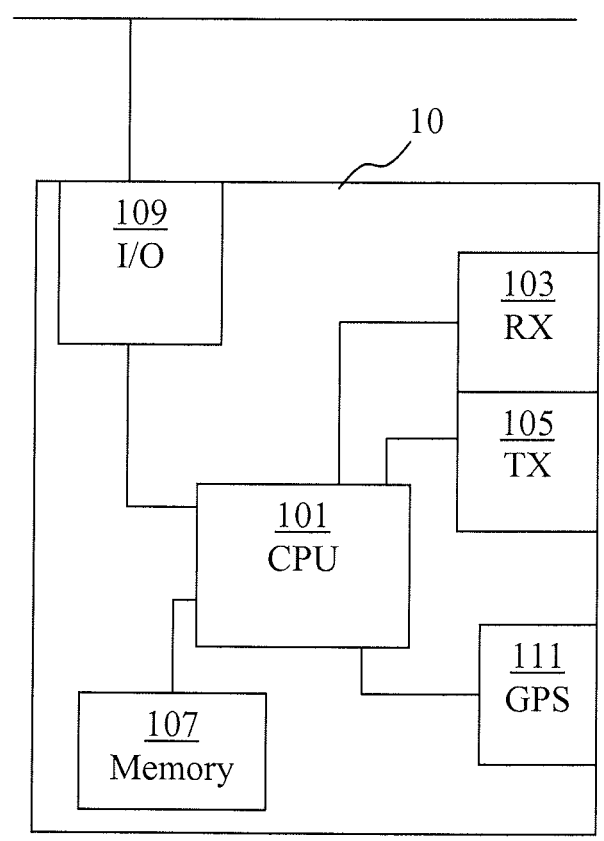
FIG. 6 shows a schematic overview of a first communication device.

In FIG. 6, a schematic overview of a first communication device is shown.

The first communication device may be a base station such as a Radio Base Station, NodeB, and/or the like; or a combined base station and controller unit such as an evolved NodeB and/or the like. The first communication device 10 comprises adaptive neighbouring cell relations function stored on a memory unit 107 of the first communication device and a control unit 101 arranged to execute the adaptive neighbouring cell relations function.

The first communication 10 device comprises a receiving arrangement 103 adapted to receive a measurement report of a possible neighbouring cell candidate from a user equipment connected to/camped on a first cell of the first communication device 10. The control unit 101 may be arranged to determine Phy-CID from the report and request the user equipment to retrieve global CID of the possible neighbouring cell over a transmitting arrangement 105. The global CID/Phy-CID is then to be used to send an inter node connection request to, such as an X2 setup request, an Iur setup request and/or the like, over a network interface I/O 109.

The control unit 101 is arranged to determine to set up an inter node connection (IC) to a second communication device serving the cell indicated in the received measurement report. The control unit 101 may check whether the cell is already in a neighbouring list then no set up is needed. The control unit 101 may further be arranged to check whether the Cell-ID, UE, and/or eNB IDs of the possible neighbouring cell is in a list of non trusted Cell-IDs, UEs, and/or eNBs indicating that no neighbouring relationship should be established stored in the memory unit 107 of the first communication device.

The control unit 101 is further arranged to initiate setting up (a setup of) an inter node connection to a second communication device serving the possible neighbouring cell candidate indicated in the measurement report. The inter node connection comprises an X2 connection within an E-UTRAN and/or the like.

The control unit 101 is arranged to initiate the setup of the inter node connection to the second communication device by sending a connection request comprising a geographical position of the first communication device to the second communication device, for example, using the global CID of the possible neighbouring cell candidate. The geographical position may comprise a Global Positioning System geographical position and/or the like, retrieved from a positioning system 111 of the first communication device, such as a GPS system, and/or the like. The connection request may also comprise a direction/coverage/output power of the first cell served by the first communication device retrieved from the memory unit 107.

The receiving arrangement 103 may further be arranged to receive an inter node connection response to the connection request, wherein the inter node connection response may comprise a negative inter node connection response indicating a false neighbouring cell relationship, or a positive inter node connection response indicating a true neighbouring cell relationship.

The control unit 101 may furthermore be arranged to decide to add the cell to a neighbour relation list of the adaptive neighbouring cell relations function, stored in the memory 107, based on the measurement report and/or the inter node connection response. For example, the possible neighbouring cell candidate is stored in the neighbour relation list if the inter node connection response is positive.

In some embodiments, the first communication device receives over the network interface 109 an inter node connection response to the connection request, a negative inter node connection response indicating a false neighbouring cell relationship, for example, an inter node connection setup failure message. The control unit 101 may read a cause value in the received inter node connection response indicating that the inter node connection response is negative since the neighbouring relationship is not sensible from a geographical perspective.

The control unit 101 may further be arranged to store an identity of the user equipment that sent the measurement report as a non trusted user equipment in a list, a so called blacklist, in the memory unit 107. The control unit 101 may further be arranged to store an identity of the second communication device in a list indicating that cells of communication devices listed in the list are never to be considered as neighbouring cells to the cells served by the first communication device.

The control unit 101 is furthermore arranged to transmit an indication that the user equipment/cell is non-trusted to a neighbouring communication device in handover signalling over the network interface I/O 109.

Furthermore, the control unit 101 may be arranged to log the request procedure as a denied procedure to, for example, determine whether e.g. a denial of service attack is in progress. Logging information from the logging may be stored in the memory unit 107.

Furthermore, the first communication device may comprise the receiving arrangement 103 and the transmitting arrangement 105 arranged to communicate with UEs camped/connected in cells of the first communication device. The first communication device may then deny/ignore a measurement report over the receiving arrangement 103 from a user equipment in the blacklist in the adaptive neighbouring cell relations function and transmit an indication of denial/rejection to the user equipment over the transmitting arrangement 105.

A control unit 101 may comprise a CPU, a single processing unit, a plurality of processing units, and or the like.

A memory unit 107 may comprise a single memory unit, a plurality of memory units, external and/or internal memory units.

Figure 7:
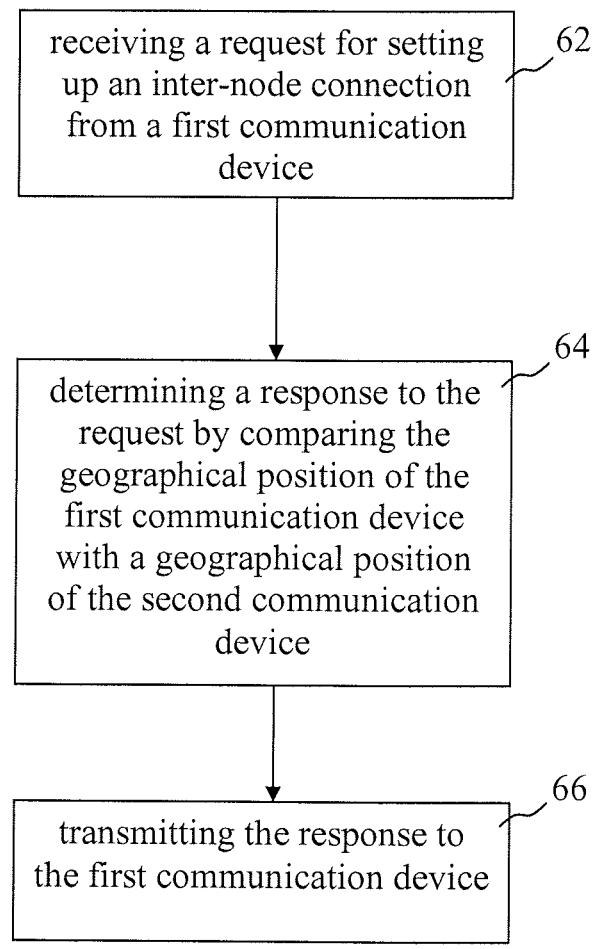
FIG. 7 shows a schematic overview of a flowchart of a method in a second communication device.

In FIG. 7, a schematic overview of a method in a second communication device is shown.

In step 62, the second communication device receives a connection request for setting up an inter node connection between a first communication device and the second communication device from the first communication device, wherein the connection request comprises a geographical position of the first communication node.

In step 64, the second communication device determines an inter node connection response to the connection request by comparing the geographical position of the first communication device with a geographical position of the second communication device. The inter node connection response indicates a negative inter node connection response if it is determined that the geographical position of the first communication device is not within a range of the geographical position of the second communication device indicating a non neighbouring relationship.

In step 66, the second communication device transmits the inter node connection response to the first communication device.

Figure 8:
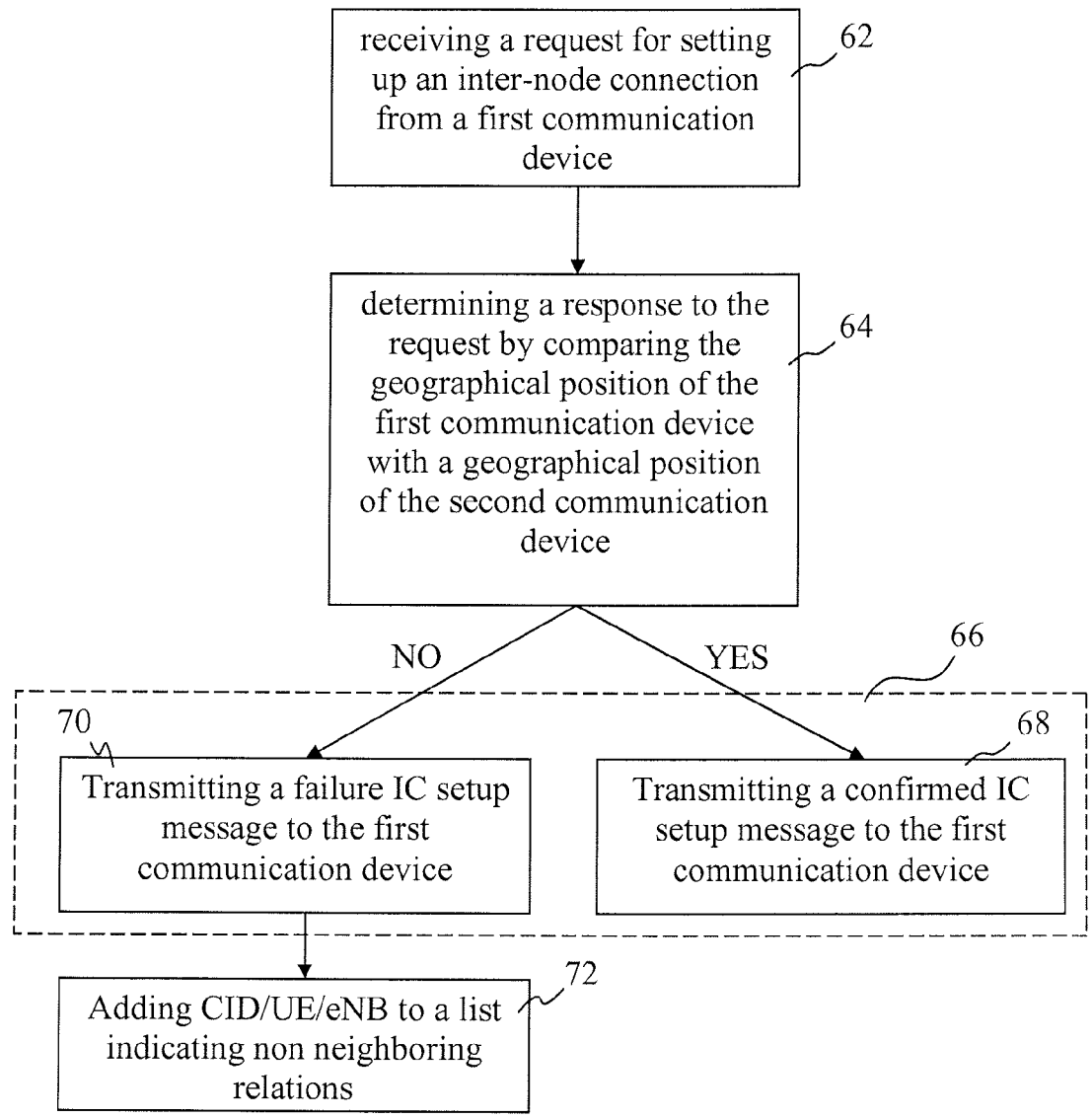
FIG. 8 shows a schematic overview of a flowchart of a method in a second communication device.

In FIG. 8, a schematic overview of an example of a method in a second communication device is shown.

In step 62, the second communication device receives a connection request for setting up an inter node connection between a first communication device and the second communication device from the first communication device, wherein the connection request comprises a geographical position of the first communication node. The connection request may be an X2 setup connection request over an X2 connection. The inter node connection may in some alternative embodiments comprise Iur connection, and/or the like.

In step 64, the second communication device determines an inter node connection response to the connection request by comparing the geographical position of the first communication device with a geographical position of the second communication device. The inter node connection response indicates a negative inter node connection response if it is determined that the geographical position of the first communication device is not within a (distance) range of the geographical position of the second communication device indicating a non neighbouring relationship. It should here be understood that the connection request may further comprise a direction/coverage/output power of at least one cell served by the first communication device and the step of determining the inter node connection response takes the direction/coverage/output power into account when determining the inter node connection response.

In some embodiments, the range is based on strength/direction/output power/and/or coverage, for example, being in the range twice the radius (length in meters) of a cell of the second communication device.

In some embodiments, the second communication device geographical position is determined from a GPS system within the second communication device, manually, by triangulation and/or the like.

In step 66, the second communication device transmits the inter node connection response to the first communication device.

In step 68, the second communication device transmits a positive inter node connection response indicating that setup of the inter node connection is confirmed.

In step 70, the second communication device transmits a negative inter node connection response indicating a inter node setup failure/rejection comprising, in some embodiments, a cause value indicating a cause of rejection.

In step 72, the second communication device may store an identity of the first communication device in a list indicating that cells of communication devices listed in the list will not (never) be considered as neighbouring cells to the cells served by the second communication device. The list indicates, for example, cells/eNBs of non neighbouring relations.

In some embodiments, the second communication device receives an indication from a first communication device indicating a user equipment that sends erroneous neighbouring measurement reports and adds an identity of the user equipment in a list comprising user equipment that sends erroneous neighbouring measurement reports. The second communication device may also store rejected cells in a list.

The second communication device may also deny/ignore a measurement report from a user equipment/of a cell in the list in the adaptive neighbouring cell relations function.

In order to perform the method according to FIGS. 7 and 8 a second communication device is provided.

Figure 9:
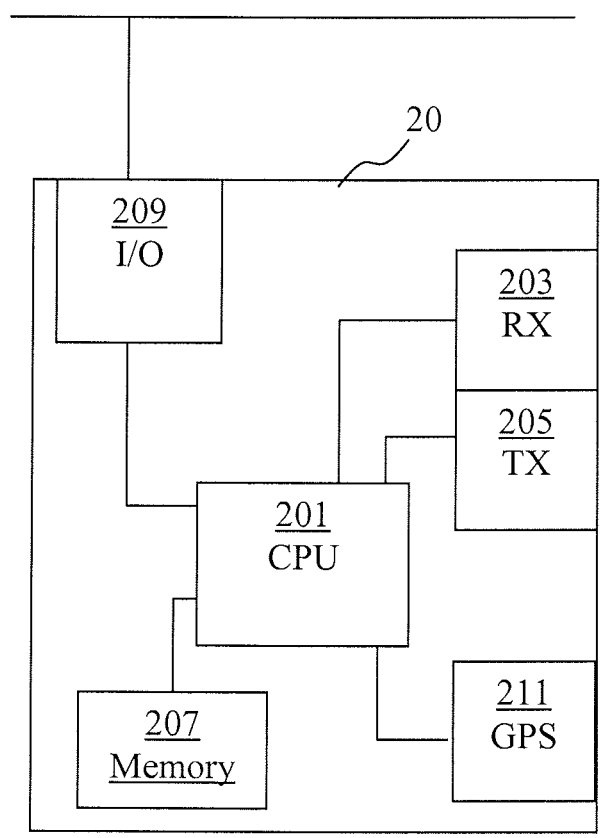
FIG. 9 shows a schematic overview of a second communication device.

In FIG. 9, a schematic overview of a second communication device 20 is shown.

The second communication device may comprise a base station such as a Radio Base Station, NodeB, and/or the like; or a combined base station and controller unit such as an evolved NodeB and/or the like. The second communication device 20 comprises a network interface 209 arranged to receive a connection request for setting up an inter node connection (IC) between a first communication device and the second communication device from the first communication device, wherein the connection request comprises a geographical position of the first communication node. The inter node connection may comprise an X2 connection within an Evolved Universal Terrestrial Radio Access Network, Iur connection within an Universal Terrestrial Radio Access Network and/or the like, wherein the network interface 209 comprises an X2 Interface, an Iur Interface and/or the like.

The second communication device 20 further comprises a control unit 201 arranged to determine an inter node connection response to the connection request by comparing the geographical position of the first communication device with a geographical position of the second communication device. The inter node connection response comprises a negative inter node connection response if it is determined that the geographical position of the first communication device is not within a range of the geographical position of the second communication device indicating a non neighbouring relationship and the inter node connection response comprises a positive inter node connection response if it is determined that the geographical position of the first communication device is within a range of the geographical position of the second communication device confirming a neighbouring relationship.

Furthermore, the control unit 201 is arranged to transmit the inter node connection response over the network interface 209 to the first communication device.

It should here be understood that the connection request may further comprise a direction/coverage/output power of at least one cell served by the first communication device and the control unit 201 takes the direction/coverage/output power into account when determining the inter node connection response. The control unit 201 may, for example, be arranged to calculate the coverage of its own cells and compare that with calculations of received cell coverage to determine whether the cells are (sensible) neighbouring cells.

In some embodiments, the range is based on strength/direction/output power/and/or coverage, for example, being in the range twice the radius of a cell of the second communication device and/or the first communication device. For example, the "size" (coverage) of a cell of a second communication device may be much smaller but still may a cell of the first communication device be a neighbouring cell. Hence, in order to include all possible neighbouring cells the control unit 201 may be arranged to determine the biggest cell (greatest coverage area) of the first and second cells and based on that, set the range of the distance between the first communication and the second communication device to twice the radius of the biggest cell. Another example would be to set the range to the longest distance of the coverage in a direction of a cell.

In some embodiments, the control unit 201 may be arranged to determine the geographical position from an internal positioning system, for example, a GPS 211 within the second communication device, or may be determined by manual input at installation, by triangulation from received signals and/or the like.

In some embodiments, the control unit 201 may be arranged to transmit the negative inter node connection response comprising a cause value indicating a cause of rejection over the network interface 209. For example, the control unit 201 may add in the inter node connection response a two bit field wherein a single one value indicates that the control unit 201 has determined that the cell is not a sensible neighbouring cell from a geographical perspective.

The control unit 201 may furthermore be arranged to store in a memory 207 an identity of the first communication device in a list indicating that cells of communication devices listed in the list will never be considered as neighbouring cells to the cells served by the second communication device. It should be understood that the list may contain UE IDs, eNB IDs, Cell IDs, and/or the like.

In some embodiments, the control unit 201 may be arranged to receive an indication from a first communication device over the network interface 209 indicating a user equipment that sends erroneous neighbouring measurement reports and to add an identity of the user equipment in a list comprising user equipment that sends erroneous neighbouring measurement reports.

Furthermore, the second communication device may comprise a receiving arrangement 203 and a transmitting arrangement 205 arranged to communicate with UEs camped/connected in cells of the second communication device. The second communication device may then deny/ignore a measurement report over the receiving arrangement 203 from a user equipment in the list in the adaptive neighbouring cell relations function and transmit an indication of that the user equipment over the transmitting arrangement 205.

The control unit 201 may comprise a CPU, a single processing unit, a plurality of processing units, and or the like.

The memory unit 207 may comprise a single memory unit, a plurality of memory units, external and/or internal memory units.

Embodiments are described with reference to block diagrams and/or flowchart illustrations of methods, apparatus (systems). It is understood that several blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. For example, step 50 in FIG. 5 may be executed before step 44 and if the inter node connection response is negative the cell may be removed from the ANR list.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a first communication device with an adaptive neighboring cell relations function, comprising:
  receiving a measurement report of a possible neighboring cell candidate of a second communication device from a user equipment camped/connected within a first cell served by the first communication device;
  determining to set up an inter-node connection to the second communication device serving the possible neighboring cell candidate indicated in the received measurement report;
  initiating set up of the inter-node connection to the second communication device by sending a connection request comprising a geographical position of the first communication device to the second communication device;
  receiving an inter-node connection response to the connection request that includes a negative inter-node connection response indicating a false neighboring cell relationship when the geographical position of the first communication device is not within a range of the geographical position of the second communication device; and
  storing an identity of the second communication device in a list indicating that cells of communication devices listed in the list are not considered as neighboring cells to the cell served by the first communication device when the inter-node connection response is the negative inter-node connection response.

2. The method of claim 1, wherein the connection request further comprises at least one of a direction, coverage, and output power of the first cell.

3. The method of claim 1, further comprising receiving an inter-node connection response to the connection request that is a positive inter-node connection response indicating a true neighboring cell relationship.

4. The method of claim 3, further comprising adding the possible neighboring cell candidate to a neighbor relation list of the adaptive neighboring cell relations function based on at least one of the measurement report and the inter-node connection response.

5. The method of claim 3, further comprising storing an identity of the user equipment that sent the measurement report as a non-trusted user equipment in a list.

6. The method of claim 5, further comprising transmitting an indication that at least one of the user equipment and the possible neighboring cell candidate is non-trusted to a neighboring communication device in handover signaling.

7. The method of claim 3, further comprising logging a procedure based on the connection request as a denied procedure.

8. The method of claim 1, wherein the inter-node connection comprises an X2 connection in an Evolved Universal Terrestrial Radio Access Network.

9. The method of claim 1, wherein the geographical position comprises a Global Positioning System geographical position.

10. A method in a second communication device, comprising:
  receiving a connection request for setting up an inter-node connection between a first communication device and the second communication device from the first communication device, wherein the connection request comprises a geographical position of the first communication device;
  determining an inter-node connection response to the connection request by comparing the geographical position of the first communication device with a geographical position of the second communication device, wherein the inter-node connection response comprises a negative inter-node connection response if it is determined that the geographical position of the first communication device is not within a range of the geographical position of the second communication device indicating a non-neighboring relationship; and
  transmitting the inter-node connection response to the first communication device.

11. The method of claim 10, wherein the connection request further comprises at least one of a direction, coverage, and output power of at least one cell served by the first communication device, and determining the inter-node connection response takes into account at least one of the direction, coverage, and output power and at least one of a direction, coverage, and output power of cells of the second communication device when determining the inter-node connection response.

12. The method of claim 10, wherein the inter-node connection response that indicates a negative inter-node connection response comprises a cause value indicating a cause of rejection.

13. The method of claim 10, further comprising receiving an indication from the first communication device indicating a user equipment that sends erroneous neighboring measurement reports, and adding an identity of the user equipment to a list of user equipments that send erroneous neighboring measurement reports.

14. The method of claim 13, further comprising at least one of denying and ignoring a measurement report from a user equipment on the list.

15. The method of claim 10, wherein the range is based on at least one of a strength, direction, output power, and coverage.

16. The method of claim 10, further comprising storing an identity of the first communication device in a list indicating that cells of communication devices listed in the list are not considered as neighboring cells to cells served by the second communication device.

17. The method of claim 10, wherein the inter-node connection comprises an X2 connection in an Evolved Universal Terrestrial Radio Access Network.

18. The method of claim 10, wherein the geographical position comprises a Global Positioning System geographical position.

19. A first communication device, comprising:
a memory unit having a stored adaptive neighboring cell relations function;
a control unit configured to execute the stored adaptive neighboring cell relations function; and
a receiver configured to receive a measurement report of a possible neighboring cell candidate from a user equipment in a cell of the first communication device;
wherein the control unit is further configured to determine whether to set up an inter-node connection to a second communication device serving the possible neighboring cell candidate indicated in the received measurement report, and to initiate set up of the inter-node connection to the second communication device by sending a connection request comprising a geographical position of the first communication device to the second communication device over a network interface;
the receiver is further configured to receive an inter-node connection response to the connection request that includes a negative inter-node connection response indicating a false neighboring cell relationship when the geographical position of the first communication device is not within a range of a geographical position of the second communication device; and
the control unit is further configured to store in the memory unit an identity of the second communication device in a list indicating cells that are not considered as neighboring cells to the cell served by the first communication device when the inter-node connection response is the negative inter-node connection response.

20. A second communication device, comprising:
a network interface configured to receive, from a first communication device, a connection request for setting up an inter-node connection between the first communication device and the second communication device, wherein the connection request comprises a geographical position of the first communication device; and
a control unit configured to determine an inter-node connection response to the connection request by comparing the geographical position of the first communication device with a geographical position of the second communication device, wherein the inter-node connection response comprises a negative inter-node connection response when the geographical position of the first communication device is not within a range of the geographical position of the second communication device, indicating a non-neighboring relationship;
wherein the network interface is further configured to transmit the inter-node connection response to the first communication device.

* * * * *

UNITED STATES PATENT AND TRADEMARK OFFICE
CERTIFICATE OF CORRECTION

| | | |
|---|---|---|
| PATENT NO. | : 8,626,170 B2 | Page 1 of 1 |
| APPLICATION NO. | : 13/260286 | |
| DATED | : January 7, 2014 | |
| INVENTOR(S) | : Ostrup | |

It is certified that error appears in the above-identified patent and that said Letters Patent is hereby corrected as shown below:

Title Page, Item (57), under "ABSTRACT", in Column 2, Line 10, delete "firs" and insert -- first --, therefor.

In the Specification

In Column 1, Line 21, delete "conFigures" and insert -- configures --, therefor.

In Column 1, Line 58, delete "conFigure" and insert -- configure --, therefor.

In Column 2, Line 8, delete "and or" and insert -- or --, therefor.

In Column 2, Line 17, delete "conFigured" and insert -- configured --, therefor.

In Column 8, Line 28, delete "communication 10 device" and insert -- communication device 10 --, therefor.

In Column 9, Line 54, delete "and or" and insert -- or --, therefor.

In Column 12, Line 39, delete "and or" and insert -- or --, therefor.

Signed and Sealed this
Fifteenth Day of July, 2014

Michelle K. Lee
*Deputy Director of the United States Patent and Trademark Office*